Figure 1:
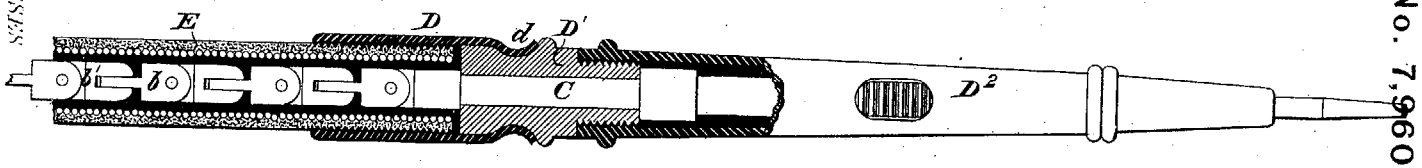

E. T. STARR.

Assignor to S. S. WHITE.

Flexible Power-Conveyer for Dental-Engines.

No. 7,960. Reissued Nov. 20, 1877.

WITNESSES

Wm. A. Skinkle

Geo. W. Brock

INVENTOR

ELI. T. STARR.

By his Attorneys

Baldwin, Hopkins & Peyton

N. PETERS, PHOTO-LITHOGRAPHER, WASHINGTON, D. C.

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN FLEXIBLE POWER-CONVEYERS FOR DENTAL ENGINES.

Specification forming part of Letters Patent No. 157,646, dated December 8, 1874; Reissue No. 7,960, dated November 20, 1877; application filed May 15, 1877.

*To all whom it may concern:*

Be it known that I, ELI T. STARR, of the city and county of Philadelphia, and State of Pennsylvania, have invented new and useful Improvements in Dental Engines, of which the following is a specification:

My invention relates to dental engines of the class in which motion is communicated from a power-driven shaft, through a flexible shaft, to a tool mounted in a hand-piece, by which means the angle at which the tool is working relatively to the driving-shaft may be freely varied without interruption to the transmission of the driving-power.

Jointed shafts, coiled-wire shafts, rattan, and catgut have all heretofore been used, or proposed to be used, as a flexible driving-shaft; but experience has demonstrated that none of these devices work as perfectly as is desirable. The long jointed shafts are not sufficiently flexible, the wire coil is liable to kink, the rattan to twist apart, and the catgut, apparently, scarcely possesses sufficient rigidity for the purposes required.

It is the object of the first part of my invention to provide a flexible driving-shaft capable of yielding flexibly in all directions without interfering with the transmission of the driving-power, and yet be free from tendency to kink; to which ends my improvement consists in a flexible shaft for transmitting power, consisting of a chain or cable composed of short links, capable of flexing freely, and yet rigid under torsional strain.

My improvement further consists in combining a stiff power-driven shaft, a flexible chain cable, and a socket-piece or chuck mounted in bearings in the hand-piece of a dental engine, and adapted to receive a dental tool.

My invention further consists in combining a chain-cable driving-shaft with a flexible non-rotating sheath in which said cable works.

The object of the next part of my invention is to provide a hand-piece adapted to be attached to the flexible non-rotating sheath enveloping the driving-shaft, so as to be capable of swiveling freely, to conform to the movements of the hand of the operator, without interfering with the free rotation of the tool-chuck mounted therein, the casing being also adapted to be readily separated for inspecting the chuck; to which end my invention consists of a hand-piece composed of sections, one of which is adapted to be secured directly to the sheath, another to swivel or turn on said fixed section without endwise movement or separation when swiveling or turning, and another which envelops the tool-chuck detachably secured to said swiveling section, to permit of the ready removal or replacement of the parts.

My invention further consists in the combination of a flexible power-driven shaft, a flexible non-rotating sheath enveloping the shaft, a hand-piece, shell, or casing connected with and swiveling upon the sheath without endwise movement or separation when swiveling or turning, and a tool-chuck mounted in the casing and connected with the driving-shaft.

My invention further consists in the combination of a hand-piece, composed of sections capable of swiveling or turning freely axially one upon the other without separation, with a rotating chuck or tool-holder mounted in bearings therein, whereby the hand-piece may be turned without interfering with the free rotation of the tool-chuck.

Figure 2:
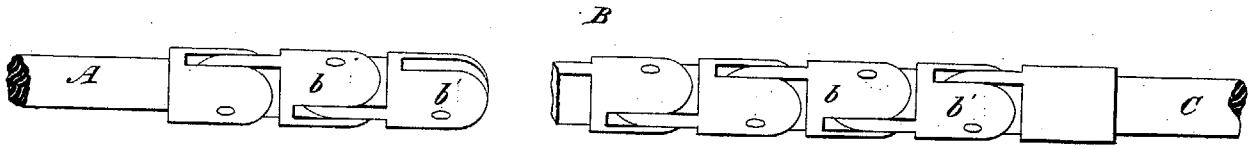

In the accompanying drawings, which exemplify the best way now known to me of carrying out my invention, Figure 1 represents a view, partly in section, of so much of the apparatus as is necessary to illustrate the invention herein claimed; Fig. 2, a view, in perspective, of a portion of the driving-shaft detached, and shown on an enlarged scale.

The shaft A, driven by power in any suitable well-known way, has a cable, B, pin-jointed to it at one end. This cable is, by preference, composed of links *b b'*, of the form shown in the drawing, each link being composed of a perforated plate of about half the depth of the link, and a forked head, the slot of which is at right angles to the plane of the plate, each plate being pin-jointed in the forks of the adjacent link.

By this mode of construction the cable is free to flex laterally, but is quite rigid against torsional strains, as the plates fit snugly between the forks of the head in which they are pivoted.

I have found, by experience, that a cable thus constructed is quite free from any tendency to kink.

The ends of the cable farthest from the power-driven shaft A are pin-jointed to a chuck or tool-holder, C, turning in suitable bearings in a hand-piece composed of sections D $D^1$ $D^2$, the inner one, D, being adapted to be firmly connected with the free end of a flexible non-rotating sheath, E, which envelops the driving-shaft, the opposite end of the sheath being secured to the engine-frame in a well-known way. The second section, $D^1$, is connected to the fixed section by a swivel-joint, *d*, of well-known construction, and with the third section, $D^2$, which envelops the tool-chuck, and constitutes the bearing for the operating-tool, by screw-threads, as usual, so as to permit of the ready separation of the detachable sections when it is desired to inspect the chuck or interior of the hand-piece.

By means of the swivel-joint, the hand-piece (except the fixed section, which constitutes but a small portion of it) is capable of turning axially or swiveling freely to conform to the movements of the hand of the operator without interrupting the free revolution of the tool-chuck and operating-tool, or varying the angle or direction of the tool.

The non-rotating flexible sheath may be of any well-known construction—such, for instance, as that shown in Nelson Stow's patent of August 6, 1872.

The operating-tools may be secured in the tool holder or socket in well-known ways.

I am aware that a swiveling dental-engine hand-piece, broadly considered, is not new; neither is it new to provide a dental-engine hand-piece with an angular attachment adapted to be mounted on the hand-piece and swivel or turn thereon, in which case the operating-tool is carried with the attachment in its swiveling movements, although its revolution is unimpeded, such a device being shown in English Patent No. 529 of 1856.

I am not aware, however, that prior to the date of my invention a hand-piece for dental engines has been constructed in which the casing which envelops and gives journal-bearings to the chuck is composed of sections connected together by a swivel-joint, so that the section upon which the fingers of the operator rest may swivel or turn axially around the chuck and operating-tool without changing the angular direction of the tool or impeding its rotation.

I am also aware that a flexible sheath connected with a hand-piece by a slip-coupling or friction-joint, which permits of the turning and endwise movement of the parts to effect their separation, is shown in Hartman's patent of August 22, 1871; but this is not a swiveling joint in the sense of my invention, as a pulling strain would separate the connection between the parts.

I am also aware that the sections of a hand-piece have been connected together by a screw which admits of the simultaneous turning and endwise movement of the parts to separate them; but this is not a swivel-joint in the sense in which I use that term.

In my hand-piece the sections are connected by a swivel-joint which permits the parts to turn freely, one upon the other, without endwise movement or separation when so swiveling, in addition to the ordinary screw-coupling which connects the detachable sections of the hand-piece enveloping the rotary tool-chuck; and the advantages of my improvements are so obvious, and their differences from the inventions referred to so radical, as to be obvious to persons skilled in the art without further elaboration.

I claim as of my own invention—

1. A chain-cable driving-shaft for dental engines, constructed, substantially as hereinbefore set forth, of short links capable of flexing freely, yet rigid under torsional strain, the same constituting a new article of manufacture.

2. The combination of a rotating power-driven shaft, the flexible short-linked chain-cable driving-shaft, the socket or chuck, and the hand-piece.

3. The combination of the hand-piece, the flexible non-rotating sheath connecting the hand-piece with the frame of the engine, and a short-linked chain-cable driving-shaft rotating within said sheath.

4. A dental-engine sectional hand-piece, constructed, substantially as hereinbefore set forth, with one of its sections adapted to be secured to the flexible sheath, another section connected with said section by a swivel-joint, so as to permit it to turn freely axially without endwise movement or separation when swiveling or turning, and a third section detachably connected with the swiveling section, and enveloping a rotating chuck or tool-holder in the same axial plane as the hand-piece, and adapted to be connected with the flexible shaft.

5. The combination, substantially as hereinbefore set forth, of a flexible power-driven shaft, a flexible non-rotating sheath enveloping the shaft, a sectional hand-piece, shell, or casing connected with and swiveling upon the sheath without endwise movement or separation when swiveling or turning, and a tool chuck or holder mounted axially in the hand-piece and connected with the driving-shaft.

6. The combination, substantially as hereinbefore set forth, of a dental-engine hand-piece, composed of sections capable of swiveling one upon the other without separation or endwise movement when turning, by means of a swivel-joint between the sections, with a rotating chuck or tool-holder mounted axially in bearings therein, whereby the hand-piece may be turned freely axially without interfering with the free rotation of the tool or changing its angular direction.

Witnesses: ELI T. STARR.

J. W. DE BARGER,

J. A. B. WILLIAMS.